United States Patent
Kim et al.

(10) Patent No.: US 9,426,506 B2
(45) Date of Patent: Aug. 23, 2016

(54) APPARATUSES FOR PROVIDING AND RECEIVING AUGMENTED BROADCASTING SERVICE IN HYBRID BROADCASTING ENVIRONMENT

(71) Applicants: Electronics and Telecommunications Research Institute, Daejeon-si (KR); UNIVERSITY-INDUSTRY COOPERATION GROUP OF KYUNG HEE UNIVERSITY, Yongin-si Gyeonggi-do (KR)

(72) Inventors: Soon-Choul Kim, Daejeon-si (KR); Jeoung-Lak Ha, Daejeon-si (KR); Jung-Hak Kim, Daejeon-si (KR); Bum-Suk Choi, Daejeon-si (KR); Young-Ho Jeong, Daejeon-si (KR); Jin-Woo Hong, Daejeon-si (KR); Kyuheon Kim, Yongin-si (KR); Jong-Hwan Park, Seoul (KR); Min-Woo Jo, Seoul (KR); Gwang-Hoon Park, Seongnam-si (KR); Doug Young Suh, Seongnam-si (KR)

(73) Assignees: UNIVERSITY-INDUSTRY COOPERATION GROUP OF KYUNG HEE UNIVERSITY, Yongin-si (KR); Electronics and Telecommunications Research Institute, Daejeon-si (KR)

( * ) Notice: Subject to any disclaimer, the term of this patent is extended or adjusted under 35 U.S.C. 154(b) by 0 days.

(21) Appl. No.: 13/973,070

(22) Filed: Aug. 22, 2013

(65) Prior Publication Data
US 2014/0059630 A1 Feb. 27, 2014

(30) Foreign Application Priority Data

Aug. 22, 2012 (KR) .................. 10-2012-0091901
Jul. 17, 2013 (KR) .................. 10-2013-0084368

(51) Int. Cl.
H04N 21/2389 (2011.01)
H04N 21/434 (2011.01)
(Continued)

(52) U.S. Cl.
CPC ....... *H04N 21/2389* (2013.01); *H04N 21/4348* (2013.01); *H04N 21/4622* (2013.01)

(58) Field of Classification Search
CPC combination set(s) only.
See application file for complete search history.

(56) References Cited

U.S. PATENT DOCUMENTS 6,215,728 B1 * 4/2001 Yamada .................. 365/233.5
7,830,965 B2 * 11/2010 Homiller ................ 375/240.26

(Continued)

FOREIGN PATENT DOCUMENTS

KR 101095296 B1 12/2011
KR 1020120036783 A 4/2012

(Continued)

*Primary Examiner* — Nasser Goodarzi
*Assistant Examiner* — Terrika Peterson
(74) *Attorney, Agent, or Firm* — William Park & Associates Ltd.

(57) ABSTRACT

An apparatus for providing an augmented broadcasting service and an apparatus for receiving the augmented broadcasting service in a hybrid broadcasting environment. The apparatus for providing the augmented broadcasting service includes: a real-time data provider configured to provide real-time data through a first transmission network; an augmented content provider configured to provide augmented content through a second transmission network, wherein the augmented content is to be synchronized with the real-time data; and a multiplexer configured to multiplex the real-time data, the augmented content metadata and timing information for synchronization between the real-time data and the augmented content metadata, and output resulting data.

8 Claims, 9 Drawing Sheets

(51) Int. Cl.
*H04N 21/462* (2011.01)
*H04N 7/173* (2011.01)
*H04L 12/26* (2006.01)

(56) References Cited

U.S. PATENT DOCUMENTS

| | | | | |
|---|---|---|---|---|
| 8,094,727 | B2* | 1/2012 | Hong et al. | 375/240.25 |
| 8,422,564 | B2* | 4/2013 | Kim et al. | 375/240.28 |
| 2003/0046431 | A1* | 3/2003 | Belleguie | 709/246 |
| 2009/0187483 | A1* | 7/2009 | You et al. | 705/14 |
| 2012/0106447 | A1* | 5/2012 | Yousefi et al. | 370/328 |
| 2012/0164938 | A1 | 6/2012 | Jeong et al. | |
| 2012/0169855 | A1* | 7/2012 | Oh | 348/61 |
| 2012/0281560 | A1* | 11/2012 | Zourzouvillys | 370/252 |
| 2013/0290995 | A1* | 10/2013 | Choi et al. | 725/12 |
| 2013/0291023 | A1* | 10/2013 | Choi et al. | 725/59 |
| 2013/0293677 | A1* | 11/2013 | Lee et al. | 348/43 |
| 2013/0346566 | A1* | 12/2013 | Kwon et al. | 709/219 |
| 2014/0059604 | A1* | 2/2014 | Kim et al. | 725/38 |
| 2014/0150018 | A1* | 5/2014 | Ha et al. | 725/34 |

FOREIGN PATENT DOCUMENTS

| | | |
|---|---|---|
| KR | 1020120071592 A | 7/2012 |
| WO | WO 2012128563 A2 * | 9/2012 |

* cited by examiner

FIG. 2

| SYNTAX | NUMBER OF BITS | SEMANTICS |
|---|---|---|
| Augmented_broadcasting_descriptor(){ | | AUGMENTATION BROADCASTING DESCRIPTOR |
| Descriptor_tag | 8 | DESCRIPTOR IDENTIFIER |
| Descriptor_length | 8 | TOTAL LENGTH OF DESCRIPTOR |
| reserved | 5 | |
| Augmented_broadcasting_service_type | 3 | TYPE OF SERVICE |
| } | | |

FIG. 3

| SYNTAX | NUMBER OF BITS | SEMANTICS |
|---|---|---|
| ABM_PES_packet_data_byte(){ | | |
| 300 ⌒ Identifier | 8 | AUGMENTED DATA IDENTIFIER |
| 301 ⌒ Initial_program_reference_clock | 33 | PCR_base |
| 302 ⌒ ABM_markup_type | 3 | METADATA FILE FORMAT |
| Reserved | 3 | |
| 303 ⌒ augmented_service_type_flag | 1 | |
| if(augmented_service_type_flag==0){ | | |
| 304 ⌒ ABM_data_length | 16 | LENGTH OF METADATA |
| 305 ⌒ ABM_data_byte | 8 | METADATA |
| } | | |
| if(augmented_service_type_flag==1){ | | |
| 306 ⌒ ABM_URL_length | 8 | LENGTH OF ACCESS URL |
| 307 ⌒ ABM_access_URL | Var | ACCESS URL |
| } | | |
| } | | |

FIG. 4

| SYNTAX | NUMBER OF BITS | SEMANTICS |
|---|---|---|
| ABM_PES_packet_data_byte() { | | |
| Identifier | 8 | AUGMENTED DATA IDENTIFIER |
| Augmented_play_time_clock | 8*n | TIME CLOCK |
| ABM_markup_type | 3 | METADATA DOCUMENT FORMAT |
| Reserved | 4 | |
| augmented_service_type_flag | 1 | |
| if(augmented_service_type_flag==0){ | | |
| ABM_data_length | 16 | LENGTH OF METADATA |
| ABM_data_byte | Var | METADATA |
| } | | |
| if(augmented_service_type_flag==1){ | | |
| ABM_URL_length | 8 | LENGTH OF ACCESS URL |
| ABM_access_URL | Var | ACCESS URL |
| } | | |
| } | | |

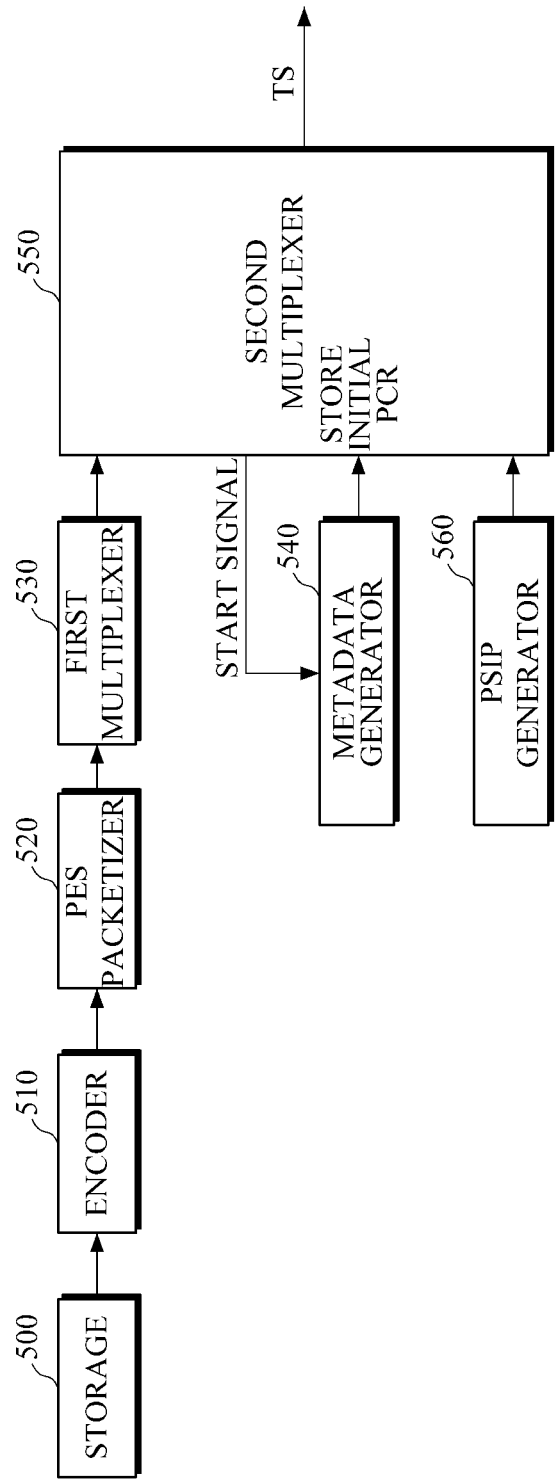

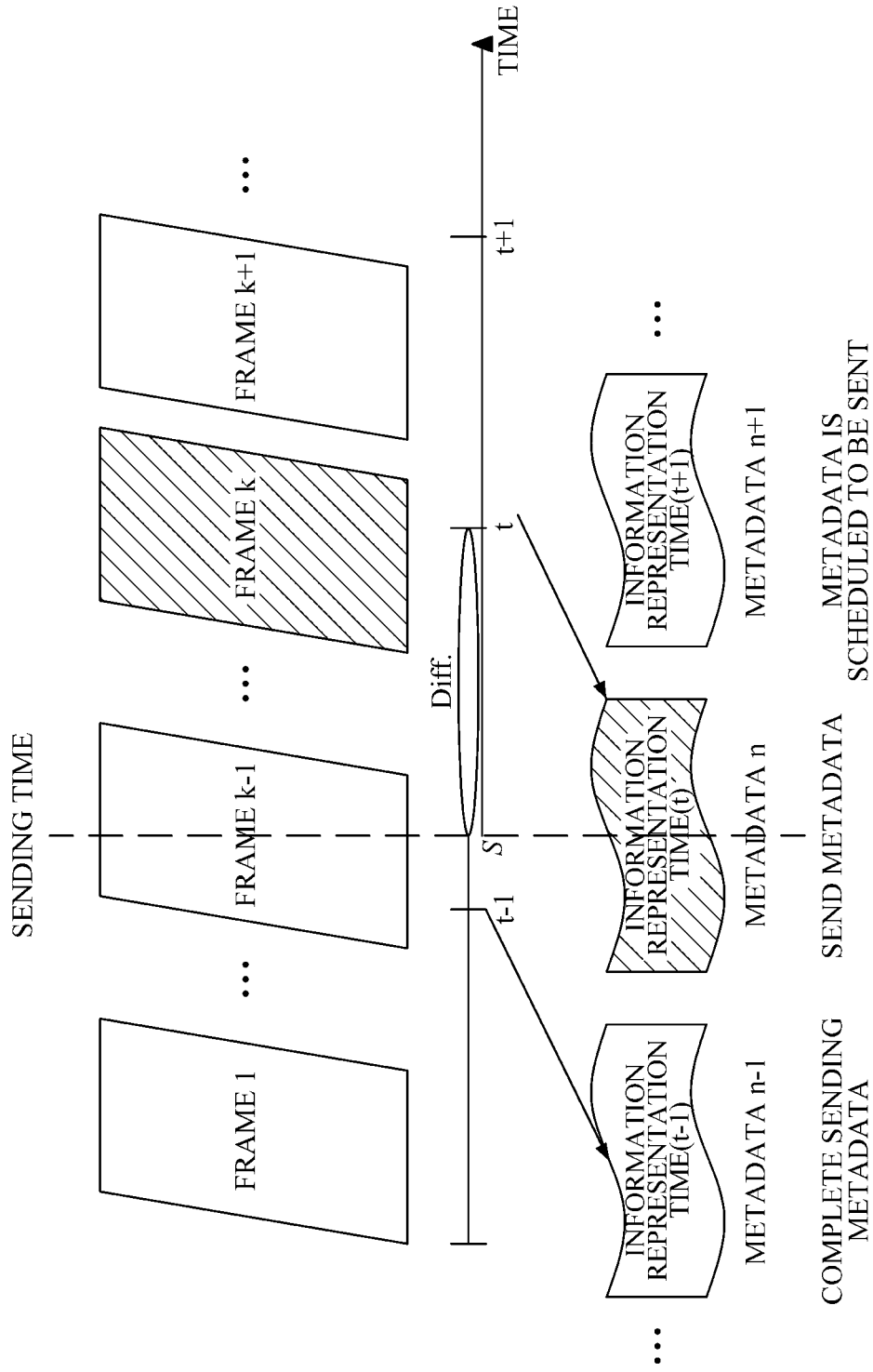

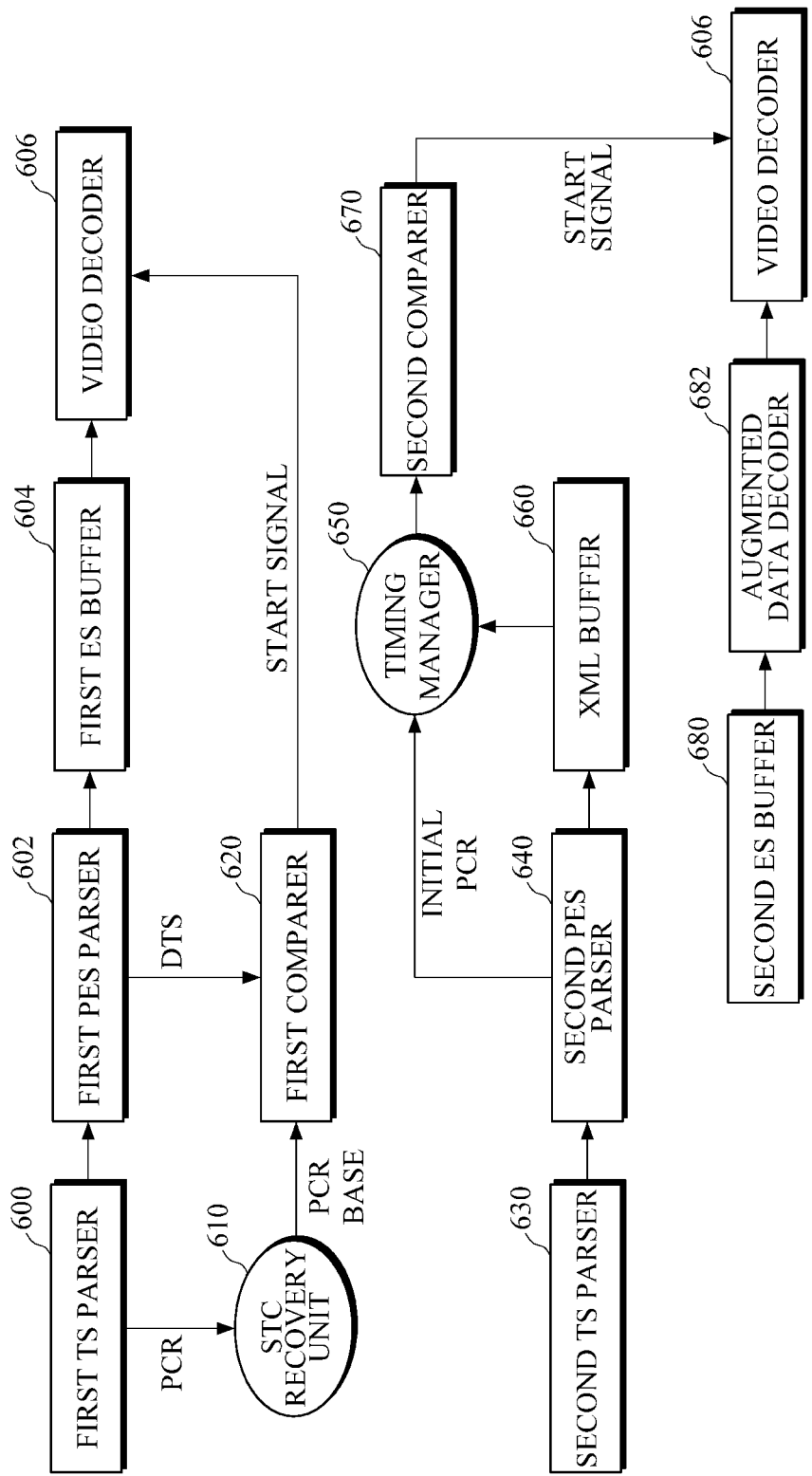

APPARATUSES FOR PROVIDING AND RECEIVING AUGMENTED BROADCASTING SERVICE IN HYBRID BROADCASTING ENVIRONMENT

CROSS-REFERENCE TO RELATED APPLICATION(S)

This application claims priority from and the benefit under 35 U.S.C. §119(a) of Korean Patent Application Nos. 10-2012-0091901, filed on Aug. 22, 2012, and 10-2013-0084368, filed on Jul. 17, 2013, in the Korean Intellectual Property Office, which are hereby incorporated by references for all purposes as if fully set forth herein.

BACKGROUND

1. Field

The following description relates to convergence of a hybrid heterogeneous network, and more particularly, to signaling and synchronization to associate real-time data and augmented content for an augmented broadcasting service in a heterogeneous network environment.

2. Description of the Related Art

As analog TV broadcasts ended, and the full transition to digital TV broadcasting transpired, a hybrid broadcasting that combines TV broadcast and high-speed Internet is anticipated to become more popular. In addition, realistic content is rising in demand, which requires a large amount of data traffic. Also, an augmented broadcasting service is expected, which is capable of providing a realistic object image or image clip during real-time broadcasting through, for example, a smart device.

The introduction of a hybrid broadcasting environment has been seen as a solution to overcome the limitations in transmission bandwidth, and it is expected that realistic content can be provided during real-time broadcasting by downloading it over the Internet. However, to associate between the broadcasting network and the Internet, definitions of augmented content-relevant information are required, and there are difficulties in providing augmented broadcasting service by the existing method since systems and timing information to synchronize content on a screen have different purposes and forms in different transmission networks.

SUMMARY

The following description relates to an apparatus for providing an augmented broadcasting service, an apparatus for receiving the augmented broadcasting service, and a signaling and synchronization method.

In one general aspect, there is provided an apparatus for providing an augmented broadcasting service, including: a real-time data provider configured to provide real-time data through a first transmission network; an augmented content provider configured to provide augmented content through a second transmission network, wherein the augmented content is to be synchronized with the real-time data; and a multiplexer configured to multiplex the real-time data, the augmented content metadata and timing information for synchronization between the real-time data and the augmented content metadata, and output resulting data.

In another general aspect, there is provided an apparatus for receiving an augmented broadcasting service, including: a transport stream receiver configured to receive a real-time transport stream through a first transmission network; a synchronizer configured to receive augmented content metadata, extract an initial program clock reference and content activation information from the received augmented content metadata, and synchronize the real-time transport stream transmitted through the first transmission network and augmented content transmitted through a second transmission network using the extracted clock and information; and a renderer to play augmented content along with a transport stream at a time to play the synchronized augmented content.

In yet another general aspect, there is provided an apparatus for receiving an augmented broadcasting service, including: a transport stream receiver configured to receive a real-time transport stream through a first transmission network; a synchronizer configured to receive augmented content metadata, extract an augmented content play time clock and content activation information from the received augmented content metadata, and synchronize the real-time transport stream transmitted through the first transmission network and augmented content transmitted through a second transmission network using the extracted clock and information; and a renderer configured to play augmented content along with a transport stream at a time to play the synchronized augmented content.

Other features and aspects will be apparent from the following detailed description, the drawings, and the claims.

BRIEF DESCRIPTION OF THE DRAWINGS

FIG. 2 is a diagram illustrating an augmented broadcasting descriptor according to an exemplary embodiment of the present invention.

FIG. 3 is a diagram illustrating payload of an augmented content metadata packet according to an exemplary embodiment of the present invention.

FIG. 4 is a diagram illustrating payload of an augmented content metadata packet according to another exemplary embodiment of the present invention.

FIG. 5 is a diagram illustrating a transmission terminal that provides a hybrid augmented broadcasting service.

FIG. 6 is a diagram illustrating the process of sending augmented content metadata according to an exemplary embodiment of the present invention.

FIG. 7 is a diagram illustrating a receiving terminal that receives a hybrid augmented broadcasting service according to an exemplary embodiment of the present invention.

Figure 1:
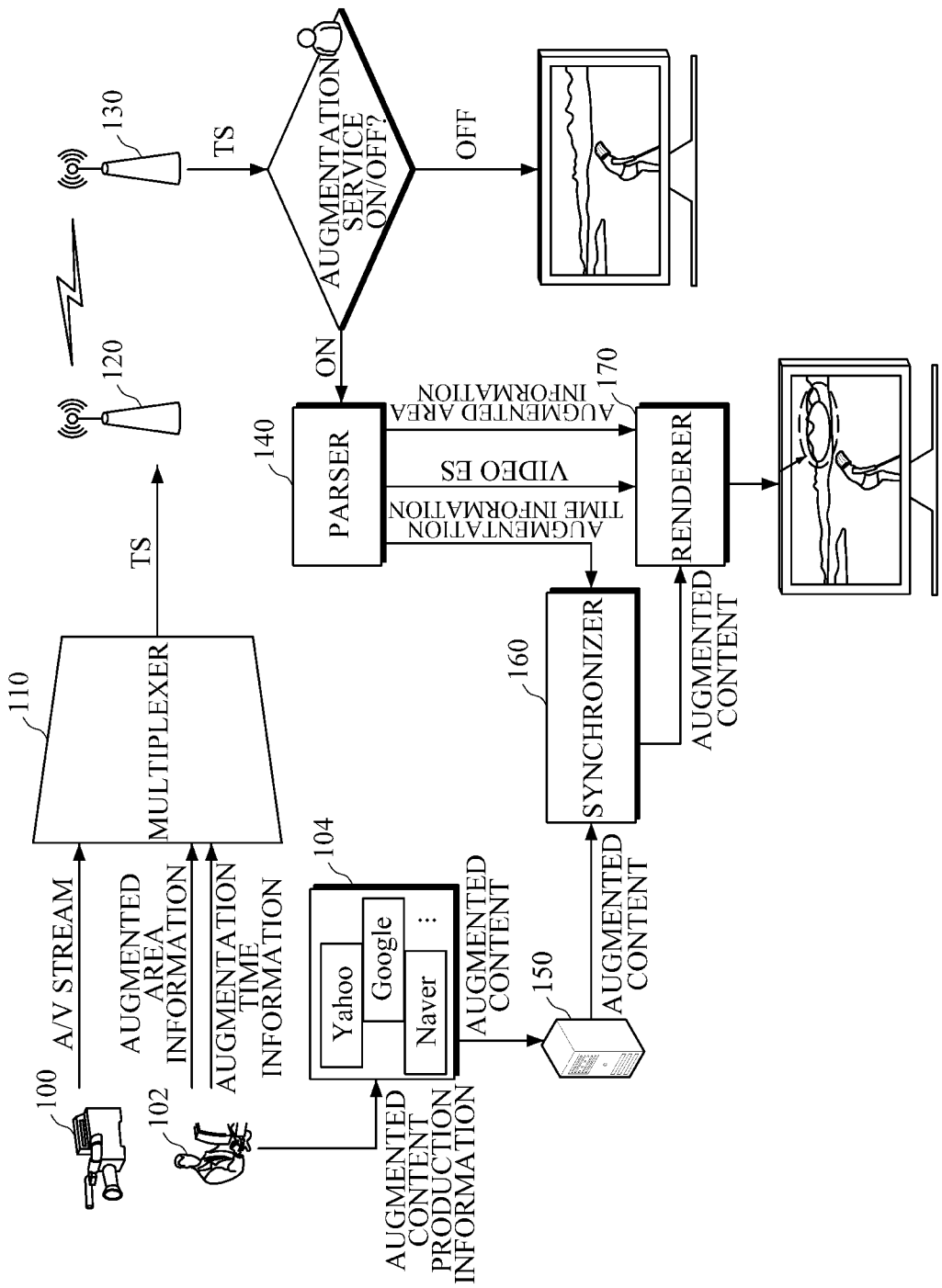
FIG. 1 is a diagram illustrating a hybrid augmented broadcasting service system according to an exemplary embodiment of the present invention.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Exemplary embodiments of the present invention are related to provision of a hybrid service in a heterogeneous network environment. The hybrid service is provided by synchronizing real-time data transmitted over a first transmission network with augmented content transmitted over a second transmission network. For example, real-time broadcast stream transmitted over a broadcasting network and augmented content transmitted over the Internet are synchronized, and the resulting data is provided.

In one example, a transmission terminal transmits to a receiving terminal, augmented broadcasting service information included within the real-time broadcast stream in the form of Augmented Broadcasting Metadata (ABM), and the receiving terminal downloads the augmented content, and reproduces the content in the form of an object with realistic features added, thereto, on a broadcasting screen for a predetermined length of time. Thus, the present invention suggests an apparatus and method for augmented broadcasting signaling and synchronization suitable for a hybrid broadcasting environment.

The transmission network applicable to the exemplary embodiments of the invention is not limited to a particular network. In addition, the exemplary embodiments of the invention are applicable to any technical fields that offer not only augmented broadcasting services, but, also, hybrid services to converge heterogeneous networks. For example, the present invention may be applicable to a situation in which there is no relevance information and synchronization information between images in a heterogeneous network synchronous transmission system aiming for occasional data activation services.

Moving Picture Experts Group (MPEG), as an international standardization organization, has developed an application format standard for augmented broadcasting services. Currently, the standardization of Augmented Reality Application Format (ARAF) is in progress, which is an extension of Binary Format for Scenes (BIFS) that is one of content object services based on MPEG-4 standards. However, the implementation of the ARAF standard is not easy in the current the broadcasting system environment, and considering the level of compatibility between various terminals at present, there are difficulties in the commercialization of ARAF. Thus, the exemplary embodiments of the present invention described herein provide a synchronization method in which augmented content is downloaded based on MPEG-2 transport stream (TS) that is compatible with a current broadcasting system, and the downloaded augmented broadcasting content is synchronized with a broadcast stream at a particular time. Hereinafter, a hybrid augmented broadcasting service that is provided when real-time data is transmitted to a receiving terminal based on MPEG-2 TS via a broadcasting network, and augmented content is transmitted over the Internet, will be described.

According to exemplary embodiments of the present invention, a transmission terminal that transmits a hybrid augmented broadcasting service has characteristics described as follows. First, the transmission terminal uses a general encoder used in a broadcast station without modification. Second, the transmission terminal re-multiplexes packets multiplexed by an MPEG-2 system, or the like, and packets containing activation information for an augmented broadcasting service. In the re-multiplexing process, the transmission terminal multiplexes a real-time broadcast stream along with augmented content metadata that is provided with a real-time broadcast stream. The augmented content metadata contains information about augmented content, such as an augmented area, position, type, representation type, and properties of augmented content, which is required for overlaying the augmented content on the real-time broadcast stream, information about cameras and sensors used in producing broadcasting content, information representation time of the augmented content, and the like. Further, the transmission terminal schedules transmission of the broadcasting stream, and the augmented content, such that they can be displayed in synchronization with each other.

A receiving terminal that receives the hybrid augmented broadcasting service according to exemplary embodiments of the present invention recognizes augmented broadcasting descriptor information and synchronization information from a reference image, and analyzes them because an image receiving time point and an image format differs from those of the transmission terminal.

Hereinafter, augmented content metadata containing network synchronization information and added to a transport stream compatible with a current real-time broadcasting system for the hybrid augmented broadcasting service is defined, and a method of processing the augmented content metadata in the receiving terminal will be described in detail with reference to accompanying drawings.

FIG. 1 illustrates a diagram of a hybrid augmented broadcasting service system according to an exemplary embodiment of the present invention.

Referring to FIG. 1, the hybrid augmented broadcasting service system includes a transmission terminal to provide an augmented broadcasting service and a receiving terminal to receive the provided service.

The transmission terminal provides a real-time broadcast program, produced and edited. A broadcast producer 100 produces audio/video stream as broadcast content, and an editor 102 edits augmented content. The editor 102 provides a multiplexer 110 with augmented content metadata including augmented area information, augmentation time information, and the like, and provides a service provider 104 with information about the production of augmented content (hereinafter, referred to as "augmented-content production information"). The service provider 104 produces the augmented content using the augmented-content production information, and if necessary, uploads the augmented content to an augmented content storage server 150. Examples of the augmented content may include advertisement produced by the service provider 104, or additional information about what interests a user while the user is receiving the broadcast, and such augmented content may be provided upon user's request. The broadcast producer 100, the editor 102, the service provider 104, and the augmented content storage server 150 are elements defined in terms of their functionality, and they may operate with different devices as shown in FIG. 1, or perform their operations within a single device.

The real-time broadcast stream provided to the receiving terminal includes the augmented content metadata. The real-time broadcast stream with the augmented content metadata passes through the multiplexer 110 and is sent to the receiver 130 via a transmitter 120. The receiver 130 may determine whether to receive the augmented broadcasting service, based on an augmented broadcasting descriptor contained in a program initialization information of the broadcast stream, and when it is determined to receive the augmented broadcasting service, transmits the broadcast stream to a TS parser 140. The TS parser 140 extracts the augmented content metadata and synchronization information by parsing the broadcast stream. A synchronizer 160 synchronizes an augmented content object and a real-time broadcast image by using the extracted synchronization information. At a synchronization time specified in the augmented content metadata, a renderer 170 activates the synchronized real-time broadcast image and augmented content object using a user terminal, for example, a smart device.

FIG. 2 illustrates a diagram of an augmented broadcasting descriptor according to an exemplary embodiment of the present invention.

Referring to FIG. 2, the augmented broadcasting descriptor 200 determines whether a receiving terminal can receive an augmented broadcast stream. The augmented broadcasting descriptor 200 may include Descriptor_tag 210, Descriptor_length 220, and Augmented_braodcasting_service_type 230.

More specifically, Descriptor_tag 210 is information that identifies an associated descriptor as an augmented broadcast descriptor. Descriptor_length 202 indicates the total length of the descriptor. Augmented_broadcasting_service_type 230 defines types of various augmented broadcasting services. For example, 3 bits may be allocated by Augmented_broadcasting_service_type 230 to distinguish between various augmented broadcasting services. 3 bits, "000", may indicate, for example, digital TV broadcasting, "001" may indicate a hybrid downloaded augmented broadcasting service, and "010" may indicate a hybrid streaming augmented broadcasting service. However, aspects of the invention are not limited thereto, such that definition of the service type may be made in various ways.

The augmented broadcasting descriptor 200 may be located in a table of a section packet, such as a virtual channel table (VCT) or event information table (EIT) of program and system information protocol (PSIP), a program map table (PMT) of MPEG-2 TS (Transport Stream) program specific information (PSI), or the like.

The augmented broadcasting service system hybrid, according to the exemplary embodiments of the present invention, relates to synchronization between a broadcasting network and the Internet in the current TV broadcasting environment where it is impractical to estimate the current broadcast position of a broadcast program, and thus it newly defines synchronization information to enable the synchronization between the broadcasting network and the Internet since these networks have different purposes and forms of synchronization information. In addition, for the synchronization of a hybrid network, the transmission terminal multiplexes a real-time broadcast stream along with augmented content metadata containing the synchronization information for augmented broadcasting, and transmits the resulting stream to the receiving terminal. Hereinafter, augmented content metadata, newly defined according to an exemplary embodiment of the present invention, is described in detail with reference to FIG. 3 and FIG. 4.

FIG. 3 illustrates a diagram of a payload of an augmented content metadata packet according to an exemplary embodiment of the present invention.

Referring to FIG. 3, the augmented content metadata is re-multiplexed, along with a real-time broadcast stream, into an elementary stream (ES) or an MPEG-2 TS. In the payload, timing information and augmented broadcasting information for synchronization between the broadcast program and augmented content may be described in XML.

Specifically, the augmented content metadata packet includes an identifier 200 to indicate an augmented content metadata payload following this field. An initial_program_reference_clock 301 includes synchronization information required for the hybrid augmented broadcasting service, and indicates a start point of a currently broadcasting program. The program start point may be represented in a graphical screen or through a particular interface to indicate the beginning of the augmented broadcasting, and may not be limited thereto. The 33-bit information of the initial_program_reference_clock 301 is Program_Clock_Reference (PCR) information of an MPEG-2 system, corresponding to PCT_base in the existing PCR time, and is reference clock information required to calculate synchronization time.

ABM_markup_type 302 defines a type of technical language of the augmented content metadata. For example, "01" may represent XML format, and "10" may represent binary format. However, aspects of the invention are not limited thereto, such that the type of technical language may be defined in various ways. Augmented_service_type_flag 303 is a field that determines whether to receive the augmented content metadata over the broadcasting network or the Internet. For example, when "0" is in the field of Augmented_service_type_flag 303, it is determined to receive the augmented content data over the broadcasting network, and when "1" is in the field, a URL address to be accessed through the Internet is defined. ABM_data_length 304 indicates a length of augmented content metadata, which is received through the broadcasting network, and ABM_data_byte 305 is a part where intended data of the augmented content metadata containing the augmented content information is inserted. AMB_URL_length 306 indicates a length of URL to access in order to download the augmented content metadata containing the augmented content information through the Internet. ABM_access_URL 307 may indicate accessed URL information when downloading the augmented content metadata through the Internet.

FIG. 4 illustrates a diagram showing a payload of an augmented content metadata packet according to another exemplary embodiment of the present invention.

Referring to FIG. 4, all fields 400, 404, 405, 406, and 407, except for Augmented_play_time_clock 401, correspond to the fields of FIG. 3, and thus descriptions thereof will not be reiterated. Augmented_play_time_clock 401 is equivalent to a time clock that is recorded in the editing process in which the augmented content production information containing augmented content playback time information is defined.

In one example, Augmented_play_time_clock 401 is not transmitted to the receiving terminal at each frame, but is transmitted to the receiving terminal before the download of the is augmented content is ensured, and the receiving terminal creates an associated time clock. The receiving terminal compares the created time clock and activation time that is defined in the augmented content metadata, and synchronizes the time.

Methods of synchronization for hybrid augmented broadcasting services in accordance with augmented content metadata structure of FIG. 3 and FIG. 4 are now described with reference to FIGS. 5 to 9.

FIG. 5 illustrates a diagram of a transmission terminal that provides a hybrid augmented broadcasting service. Specifically, FIG. 5 illustrates in detail the transmission terminal that provides the hybrid augmented broadcasting service using metadata that contains program initialization information described with reference to FIG. 3.

Referring to FIG. 5, the transmission terminal produces both a real-time broadcast program and augmented content to be inserted at a particular time of the real-time broadcast program. A scheduler organizes broadcast programs in scheduled order, and inputs raw video sequence, which is stored in a storage unit 500, to an encoder 510 in the order of scheduling. The encoder 510 may be an MPEG-2 video encoder 510. At the very moment that the raw video sequence is input to the encoder 510, the encoder 510 encodes the real-time broadcast stream by inserting PCR of the start point of the program into the real-time broadcast stream to generate an elementary stream (ES), and transmits the generated ES to a PES (packetized elementary stream) packetizer 520. The PES packetizer 520 packetizes the ES to generate a PES, and transmits the PES to a first multiplexer 530. The first multiplexer 530 multiplexes the PES into a transport stream (TS).

The generated TS is transmitted to a second multiplexer 550, and the second multiplexer 550 re-multiplexes the TS into a form suitable for the augmented broadcasting. A metadata generator 540 generates augmented content metadata having XML data or a TS stream to contain XML data, with reference to the program start point, and inputs the generated metadata to the second multiplexer 550. The second multiplexer 550 multiplexes the augmented content metadata with the TS, and transmits the resulting data to a receiving terminal. The second multiplexer 550 may multiplex the augmented content metadata according to a syntax described with reference to FIG. 3.

In one example, the metadata generator 540 stores in the second multiplexer 550 an initial PCR (i.e., Initial_program_reference_clock 301 of FIG. 3) as synchronization information with reference to the start point of the broadcast program, in response to a start signal from the second multiplexer 550, and the second multiplexer 550 multiplexes augmented content metadata, which is arranged based on transmission time, with the stored initial PCR, in units of PES, and, in the presence of augmented content data to be transmitted at a particular time, transmits the augmented content metadata at the time when a null packet is detected.

The PSIP generator 560 creates an augmented broadcasting descriptor that describes the augmented broadcasting, and inputs it to the second multiplexer 550. The input augmented broadcasting descriptor is contained in the program initialization information of the real-time broadcast stream.

Hereinafter, the packet processing process of the second multiplexer 550 is described in detail. When MPEG-2 TS is streamed or internal video data are input in real time, the second multiplexer 550 reads the MPEG-2 TS streams or internal video data in units of TS packets. At this time, a value of an initial PCR of the input MPEG-2 packet as timing information for augmented broadcasting synchronization is stored in a memory. The second multiplexer 550 multiplexes the augmented content metadata, which is arranged based on transmission time, with the stored initial PCR in units of PES, and detects whether there is augmented content metadata to be transmitted in real time during the process. If there is augmented content metadata to be transmitted at a particular time, the second multiplexer 550 transmits the augmented content metadata at the time when a null packet is detected. As the augmented content metadata has properties of randomly ordered streams, rather than consecutive data streams of the broadcast program, the timing information for the augmented broadcasting synchronization is transmitted only at the time the augmented content metadata is sent, and thereby, the receiving terminal does not need to refer to another broadcasting or data packet information when receiving and parsing the augmented content metadata. In addition, the second multiplexer 550 distinguishes between section packets (PMT, VCT, MTG), and inserts the augmented broadcasting descriptor into a section packet and transmits the section packet.

FIG. 6 illustrates a diagram showing the process of sending augmented content metadata according to an exemplary embodiment of the present invention.

FIG. 6 shows the timing at which to output augmented content metadata in accordance with the output of real-time image frames. In FIG. 6, an upper part above a recording time axis shows frames being sequentially output, and a lower part shows pieces of augmented metadata being output.

Referring to FIG. 6, a receiving terminal performs time synchronization of an image frame k, and augmented content metadata n, that are to be represented at a particular time with reference to information representation time (t). The information representation time (t) is elapsed time of images that are used by an augmented broadcasting authoring tool in the process of generating and editing an augmented area, and this time is inserted into a time field of associated augmented content metadata. When the given time s arrives while an image frame k−1 in a video/audio stream is output, the second multiplexer 550 (see FIG. 5) completes the transmission of augmented content metadata n−1 via an augmented content metadata streamer, and prepares transmission of augmented content metadata n. The augmented content metadata n is the intended data required for synchronization with an image frame at time t, and is to be transmitted earlier than the relevant image frame.

The augmented content metadata is transmitted in such a manner that it can reach a receiving terminal a given length of time ahead of the image frame, wherein the given length of time is a time difference in transmission of the augmented content data and the image frame. In order for the receiving terminal to output augmented content along with the image frame k at time t, the augmented content metadata n should reach the receiving terminal the given length of time, i.e., the time difference, ahead of the image frame k and before at least time t, because the receiving terminal needs to interpret the augmented content metadata n to extract property information and data associated with the augmented content. If the augmented content metadata n fails to reach the receiving terminal before the time t, the augmented broadcasting service with respect to the image frame cannot be ensured.

An augmented content metadata transmission information list is arranged in the order of the information representation time of each of augmented content metadata generated by an augmented broadcasting authoring server. A transmission time is determined as Equation 1 below.

$$\text{Transmission time} = \text{information representation time} - \text{content download time (broadcasting transmission time} + \text{Internet transmission time} + \text{content type)} \quad (1)$$

In Equation 1, the broadcasting transmission time represents a time for which augmented content metadata is transmitted through a broadcasting network, the Internet transmission time represents a time for which augmented content metadata is downloaded through the Internet, and the content type represents traffic in accordance with a content type.

FIG. 7 illustrates a diagram of a receiving terminal to receive a hybrid augmented broadcasting service according to an exemplary embodiment of the present invention.

Referring to FIG. 7, a transport stream (TS) received from a transmission terminal is input to a first TS parser 600. The first TS parser 600 interprets augmented_broadcasting_descriptor 200 (see FIG. 2) contained in the TS to determine whether to receive augmented broadcasting. In addition, the first TS parser 600 extracts a program clock reference (PCR) from a header, and transmits the extracted PCR to a system time clock (STC) recovery unit 610. The STC recovery unit represents an MPEG-2 system time clock (STC) using the PCR, and transmits to a first comparer 620 a PCR base contained in the PCR. The first TS parser 600 interprets the received TS to generate a PES, and inputs the generated PES to the first PES parser 602. The first PES parser 600 interprets the received PES to extract a decoding time stamp (DTS) at which to decode an ES included in the PES, and provides the extracted decoding time stamp to the first comparer 620. In addition, the first PES parser 600 interprets the PES to generate the ES and inputs the ES to a first ES buffer 604. The first ES buffer 604 buffers the received ES until the DTS arrives, and inputs the ES to a video decoder 606. The video decoder 606 decodes the ES at the DTS. The first comparer 620 compares the PCR base and the DTS, and when the PCR reaches the DTS, assigns a start signal to the video decoder 606 to perform decoding.

In addition, when the receiving terminal receives an augmented broadcasting metadata packet before the time at which download of augmented content is ensured, a second TS parser 630 parses the received augmented broadcasting metadata packet to extract a metadata PES used for augmented broadcasting, and inputs the extracted metadata PES to a second PES parser 640. The second PES parser 640 extracts initial PCR information for synchronization, and XML data for augmented broadcasting from the metadata PES. The extracted XML data is buffered in an XML buffer 660.

In one example, a timing manager 650 calculates a presentation time stamp that is an MPEG-2 system time clock, in consideration of a current status of the program, using the initial PCR and the content activation time (hour:minute: second:frame) contained in the XML data. The PTS may be calculated by Equation 2 as explained below.

$$\text{Activation DTS} = \text{Initial PCR base} + \{\text{number of frames converted from content activation time defined by XML data} \times \text{Interval of PTS (3,000)}\} \quad (2)$$

Referring to Equation 2, assuming that the initial PCR is 30,000 and a program play time for which content A defined by XML activation is 1 minute: 10 seconds: 10 frames, augmented content is activated after 2110 frames. By applying this to Equation 2, 2,110×3,000=6,330,000, as an interval value, is obtained. Then, PTS value is yielded by adding the value of initial PCR, 30,000, and the obtained interval value (6,330,000+30,000=6,360,000).

The second ES buffer 680 buffers the augmented content starting from its reception from the transmission terminal to the DTS, and inputs the augmented content to an augmented data decoder 682. The augmented data decoder 682 decodes the received augmented data. Once the timing manager 650 calculates the DTS, a second comparer 670 compares the calculated DTS value and the PCR value, and applies a start signal to a video decoder 606 when the DTS arrives. In response to the start signal, the video decoder 606 decodes broadcasting data along with the augmented content ES decoded by the augmented content decoder 682.

Figure 8:
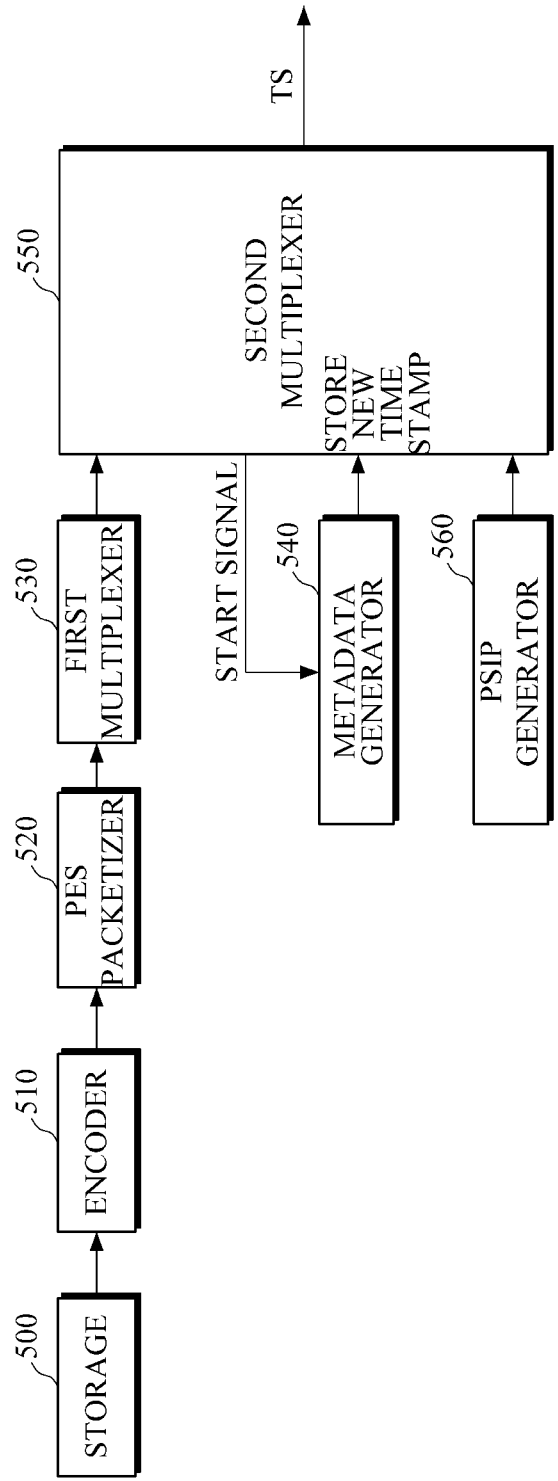
FIG. 8 is a diagram illustrating a transmission terminal that provides a hybrid augmented broadcasting service according to another exemplary embodiment of the present invention.

FIG. 8 illustrates a diagram of a transmission terminal that provides a hybrid augmented broadcasting service according to another exemplary embodiment of the present invention. The transmission terminal uses timing information used in editing augmented program. Descriptions of the same elements of FIG. 8 as those of FIG. 5 will be omitted to avoid confusion in interpretation of the invention.

Referring to FIG. 8, a transport stream (TS) that has gone through real-time encoding is input to a second multiplexer 550, and the second multiplexer 550 re-multiplex the TS into a real-time TS in a form suitable for augmented broadcasting. At this time, the second multiplexer 550 applies a start signal to a metadata generator 540 in response to receiving program start information, and the metadata generator 540 generates an Augmented_play_time_clock (401 in FIG. 4) that corresponds to a time clock used in editing the augmented content, with reference to a time point at which to receive the start signal, and inputs the Augmented_play_time_clock to the second multiplexer 550. The second multiplexer 550 receives the Augmented_play_time_clock from the metadata generator 540 and XML data from the metadata generator 540, and generates metadata using the received clock and data. The second multiplexer 550 re-multiplexes the metadata with a real-time TS, and transmits resulting metadata to a receiving terminal through a broadcasting network. In one example, the metadata is transmitted to the receiving terminal before any events occur.

Figure 9:
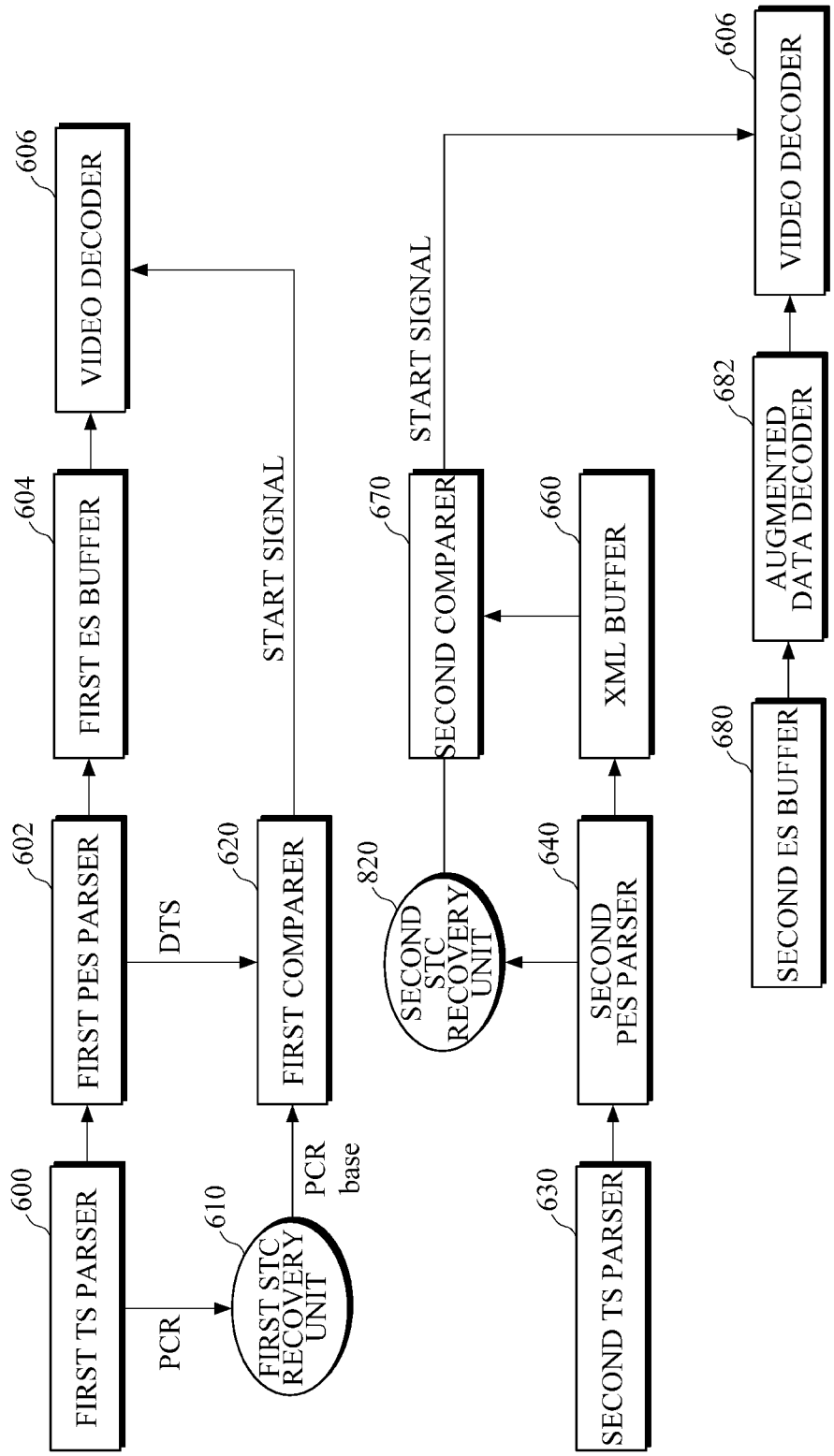
FIG. 9 is a diagram illustrating a receiving terminal that receives a hybrid augmented broadcasting service according to another exemplary embodiment of the present invention.

FIG. 9 illustrates a diagram of a receiving terminal that receives a hybrid augmented broadcasting service according to another exemplary embodiment of the present invention. The receiving terminal uses timing information used in editing an augmented program. Descriptions of the same elements of FIG. 9 as those of FIG. 7 will be omitted to avoid confusion in interpretation of the invention.

Referring to FIG. 9, in response to receiving a TS packet including XML, a second TS parser 630 interprets the TS packet to generate a PES packet, and extracts XML and an Augmented_play_time_clock (401 in FIG. 4), which is a timing information clock value used in editing the augmented program, from payload of the PES. In response to receiving the Augmented_play_time_clock, a second system time clock (STC) recovery unit 820 generates an associated STC. A second comparer 670 compares an augmented content activation time value defined in the XML to a value of STC, and applies a start signal to a video decoder 606 until the value of STC reaches a value of the Augmented_play_time_clock. In response to the start signal, the video decoder 606 decodes broadcasting data along with augmented content decoded by an augmented data decoder 682.

According to the exemplary embodiments of the present invention, signaling and synchronization to associate real-time data with downloaded augmented content are implemented, and thereby it is possible to provide a hybrid augmented broadcasting service in a heterogeneous network, for example, a hybrid broadcasting environment consisting of a broadcasting network and the Internet.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for providing an augmented broadcasting service, comprising:
    a real-time data provider configured to provide real-time data through a first transmission network;
    an augmented content provider configured to provide augmented content through a second transmission network, wherein the augmented content is synchronized with the real-time data;
    an augmented broadcasting descriptor generator circuit that generates an augmented broadcasting descriptor that determines whether an augmented broadcasting service receiving apparatus receives a transport stream, and input the generated augmented broadcasting descriptor to a multiplexer, wherein the multiplexer includes a first multiplexer and a second multiplexer in which the second multiplexer receives the generated augmented broadcasting descriptor; and the multiplexer configured to multiplex the real-time data, augmented content metadata and timing information for synchronization between the real-time data and the augmented content metadata, and output resulting data, wherein the multiplexer comprises the first multiplexer configured to multiplex a real-time transport stream, and the second multiplexer configured to re-multiplex the multiplexed real-time transport stream along with program initialization information as information for synchronization between augmented content metadata and a network, and output a resulting real-time transport stream, wherein the second multiplexer distinguishes between section packets and inserts the augmented broadcasting descriptor into a table of a section packet, and wherein the augmented broadcasting descriptor includes:
a descriptor tag including information for identifying an associated descriptor as an augmented broadcast descriptor;
a descriptor length including information on a total length of the augmented broadcasting descriptor;
an augmented broadcasting service type including information on a type of augmented broadcasting service, and
a metadata generator circuit configured to, in response to a start signal from the second multiplexer, generate augmented content metadata containing XML data having augmented content activation time information with reference to a program start point, or containing both an initial program clock reference and a transport stream to contain XML, and input resulting augmented content metadata to the second multiplexer.

2. The apparatus of claim 1, wherein the first transmission network is a broadcasting network, and the second transmission network is an Internet.

3. The apparatus of claim 1, wherein the second multiplexer is configured to multiplex the real-time transport stream by inserting the augmented broadcasting descriptor into the real-time transport stream.

4. The apparatus of claim 1, wherein the augmented content metadata comprises: synchronization information and augmented broadcasting information; the synchronization information contains an initial program clock reference that represents a start point of a currently broadcast program; and the augmented broadcasting information contains augmented broadcasting service type information that defines a type of network through which the augmented content metadata is provided; metadata of augmented content metadata to be provided through the broadcasting network; and an access address from which metadata of augmented content metadata is provided through the Internet.

5. The apparatus of claim 1, wherein the multiplexer is configured to transmit multiplexed real-time transport streams and multiplexed augmented content metadata to an augmented broadcasting service receiving apparatus through a transmitter, in such a manner that n-th augmented content metadata required for synchronization between an n-th real-time transport stream and augmented content reaches an augmented broadcasting service receiving apparatus a length of time ahead of a multiplexed n-th real-time transport stream.

6. The apparatus of claim 5, wherein the multiplexer is configured to transmit the augmented content metadata at regular intervals or upon an occurrence of an event, and transmit timing information for augmented broadcasting synchronization during a time the augmented content metadata is transmitted.

7. The apparatus of claim 5, wherein during a time at which the multiplexer transmits the augmented content metadata is obtained by subtracting an augmented content download time from an information representation time, the augmented content download time is obtained by adding a time during which augmented content metadata is transmitted through the first transmission network, a time during which augmented content metadata is transmitted through the second transmission network, and traffic in accordance with a content type, and wherein information representation time is an elapsed time of images that are used by an augmented broadcasting authoring tool in a process of generating and editing an augmented area.

8. The apparatus of claim 1, wherein if the output resulting data includes augmented content metadata to be transmitted at a particular time, then the multiplexer transmits the augmented content metadata at a time when a null packet is detected.

* * * * *